United States Patent [19]

Bundschuh

[11] Patent Number: 4,479,593

[45] Date of Patent: Oct. 30, 1984

[54] PUMP DISPENSER WITH ADJUSTABLE NOZZLE

[76] Inventor: Robert L. Bundschuh, 6534 Miami Lakes Dr. East, Miami Lakes, Fla. 33014

[21] Appl. No.: 396,832

[22] Filed: Jul. 9, 1982

[51] Int. Cl.³ .............. G01F 11/36

[52] U.S. Cl. .............. 222/321; 222/341; 222/379; 222/380; 239/539

[58] Field of Search .............. 222/251, 320, 321, 336, 222/340, 341, 372, 379, 380, 383, 385, 409; 239/333, 539, 538

[56] References Cited

U.S. PATENT DOCUMENTS

| | | | |
|---|---|---|---|
| 2,753,578 | 7/1956 | Lebet | 15/133 |
| 3,248,021 | 4/1966 | Corsette et al. | 222/321 |
| 3,282,472 | 11/1966 | Roder | 222/321 |
| 3,527,551 | 9/1970 | Kutik et al. | 417/560 |
| 3,749,290 | 7/1973 | Micallef | 222/385 |
| 3,877,616 | 4/1975 | Stevens | 222/321 |
| 4,046,495 | 9/1977 | Grimm, Jr. | 417/268 |
| 4,072,252 | 2/1978 | Steyns et al. | 222/341 |
| 4,153,186 | 5/1979 | Nye | 222/378 |
| 4,159,067 | 6/1979 | Akers | 222/153 |
| 4,161,288 | 7/1979 | McKinney | 239/333 |
| 4,249,681 | 2/1981 | French | 222/380 |
| 4,273,268 | 6/1981 | Wickenberg | 222/321 |
| 4,330,071 | 5/1982 | Ohlson | 222/207 |
| 4,347,953 | 9/1982 | Bauer | 222/207 |
| 4,371,097 | 2/1983 | O'Neill | 222/321 |
| 4,410,107 | 10/1983 | Corsette | 222/321 |

*Primary Examiner*—Joseph J. Rolla
*Assistant Examiner*—George Pyryt
*Attorney, Agent, or Firm*—Roylance, Abrams, Berdo & Goodman

[57] ABSTRACT

A manually-operated pump dispenser for dispensing liquids from a container. The dispenser includes a one-piece housing coupled to the container, a dip tube extending from the housing into the container, a one-piece pump member which is slidably supported in the housing and which has a trigger extending therefrom and a nozzle member at the end, a pair of one-way valves supported by the housing and pump member, a one-piece, plastic tubular member which engages the housing and pump member and forms a part of at least one of the one-way valves in the dispenser, and a spring engaging a portion of the pump member and the tubular member for biasing the pump member away from the housing. In a first embodiment, the tubular member forms a part of each of the one-way valves, and in a second embodiment, it forms a part of the inboard one-way valve. In this second embodiment, the outboard valve is formed by the nozzle member and the pump member, both being formed of plastic. In another embodiment, the tubular member is eliminated, the inboard valve is formed by the housing and the pump member, and the outboard valve is formed by the pump member and the nozzle member.

17 Claims, 19 Drawing Figures

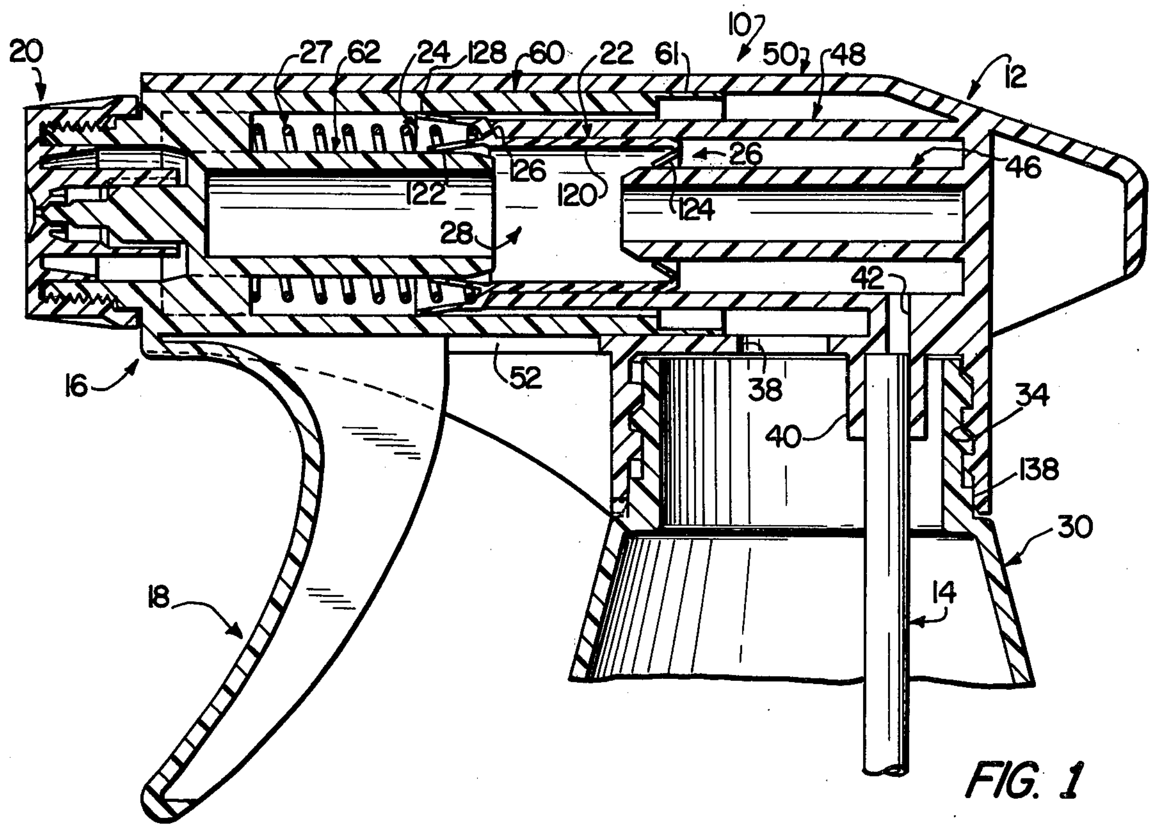
FIG. 1
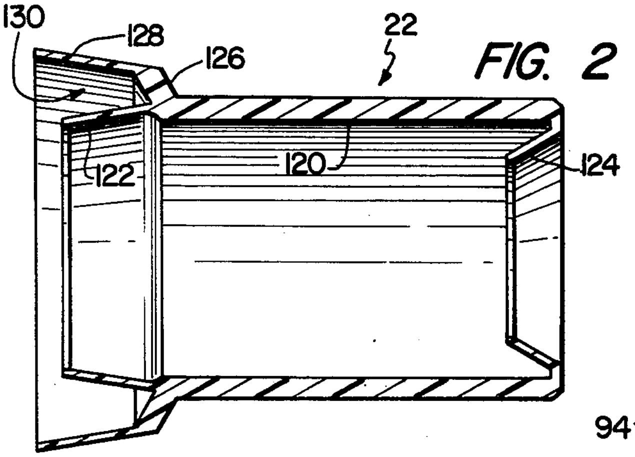
FIG. 2
FIG. 3
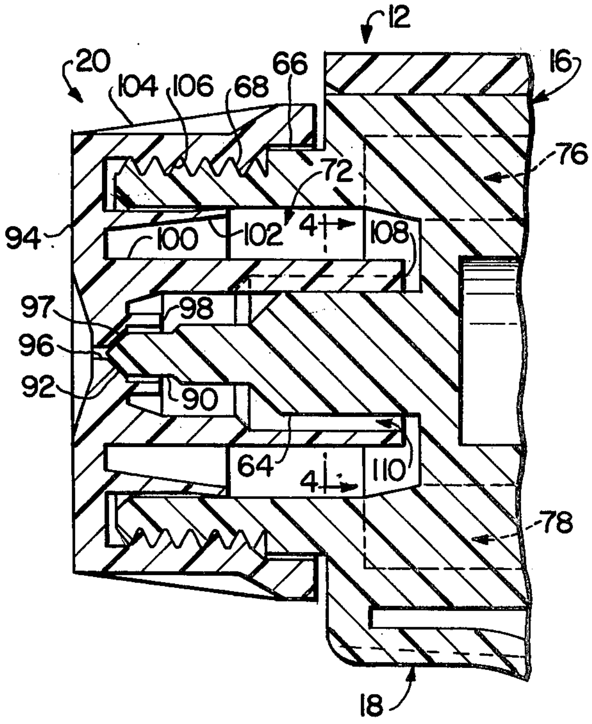
FIG. 4
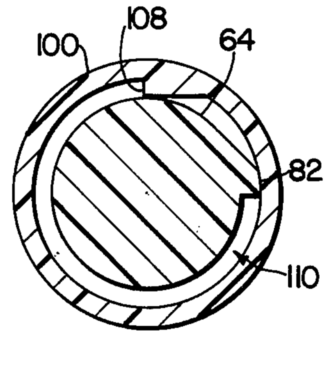

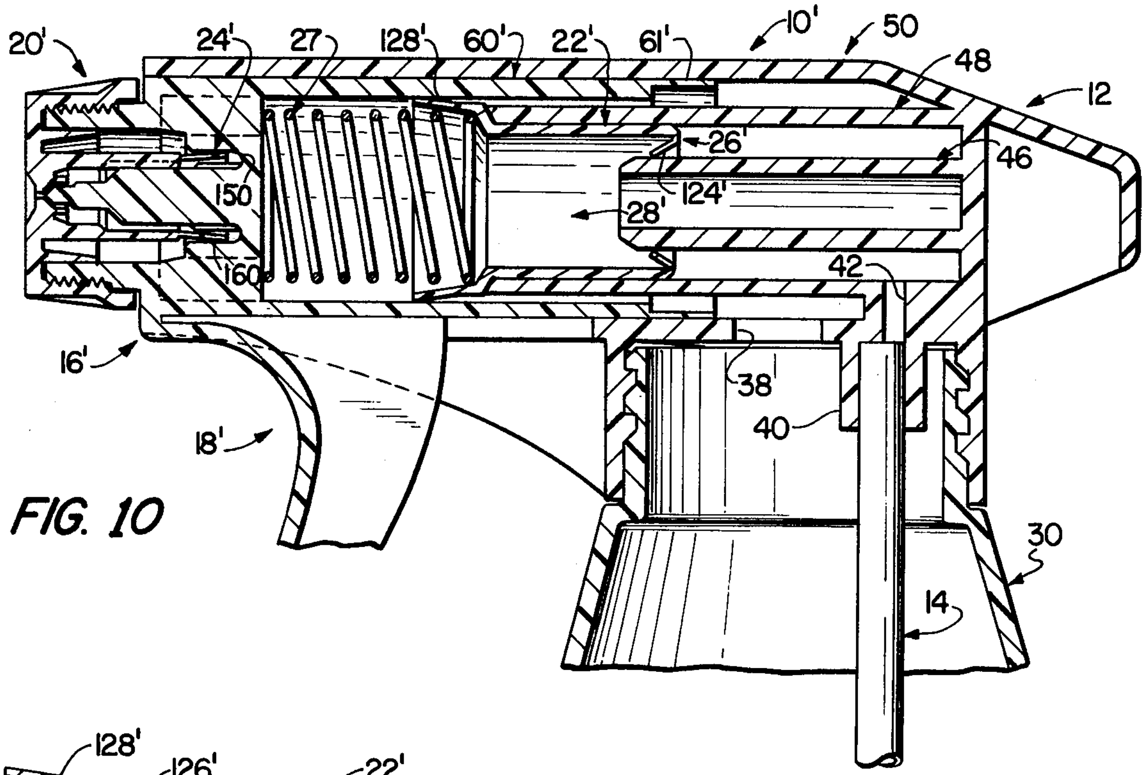
FIG. 10
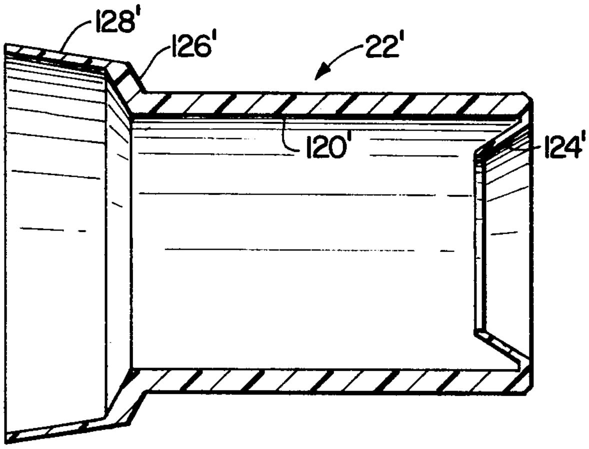
FIG. 11
FIG. 12
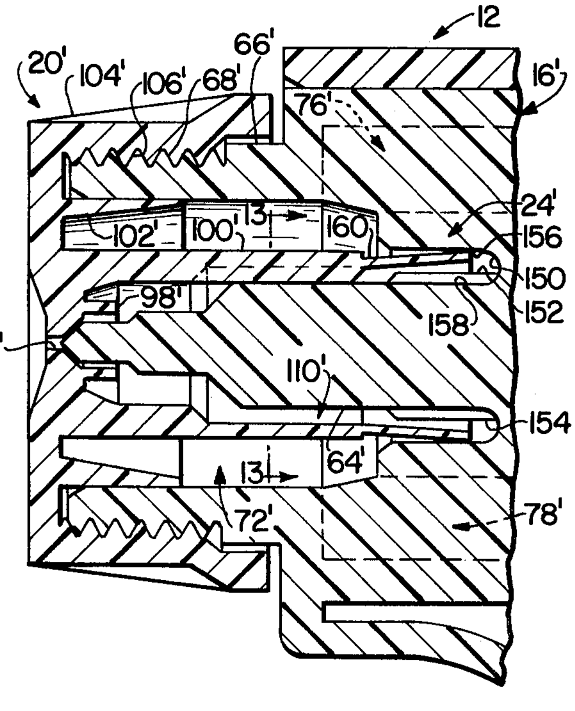
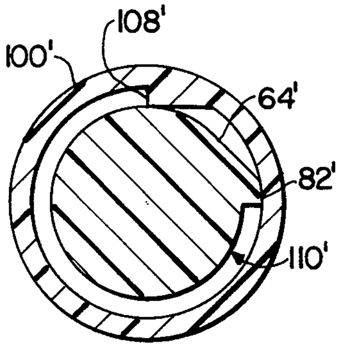
FIG. 13

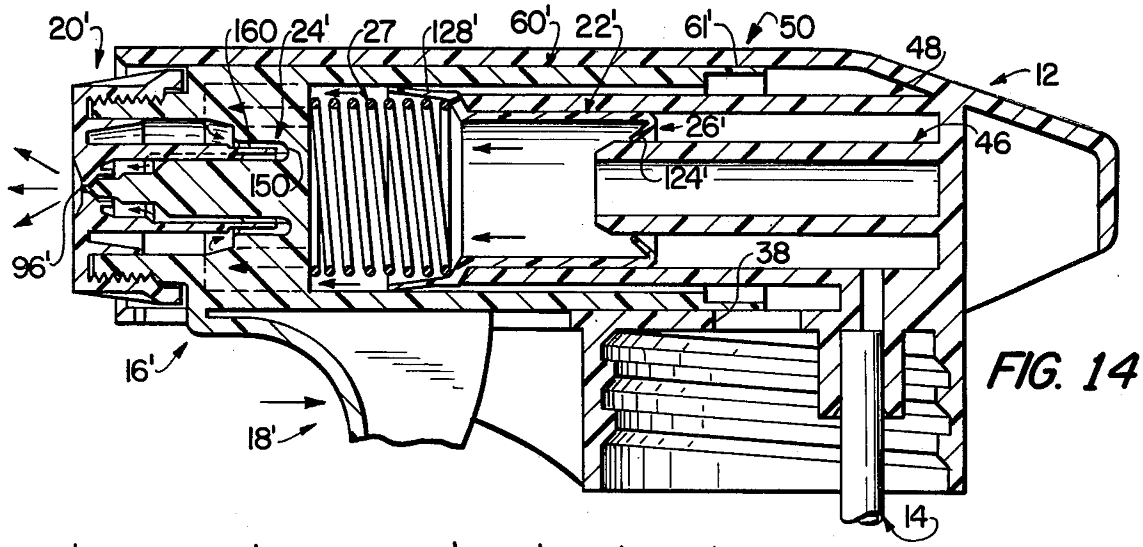
FIG. 14
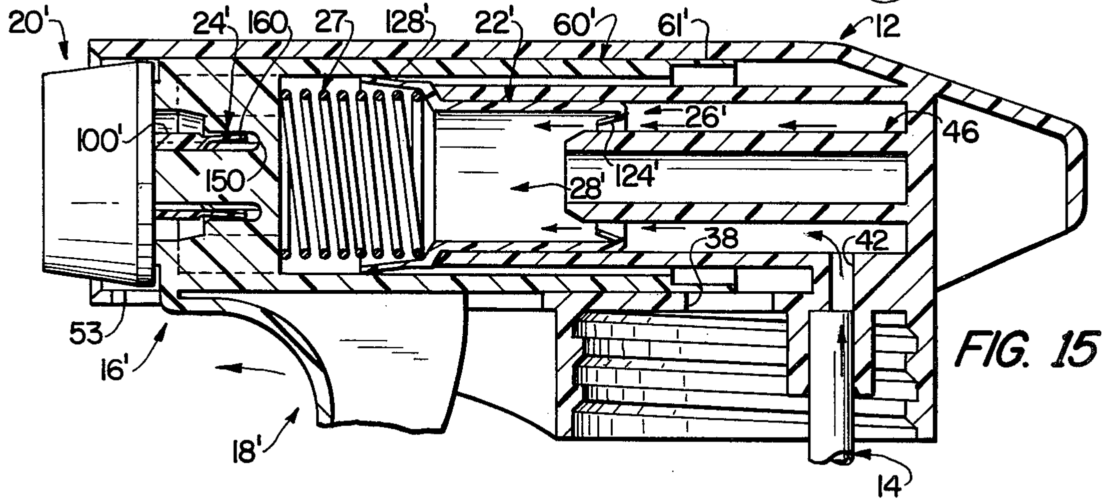
FIG. 15
FIG. 16
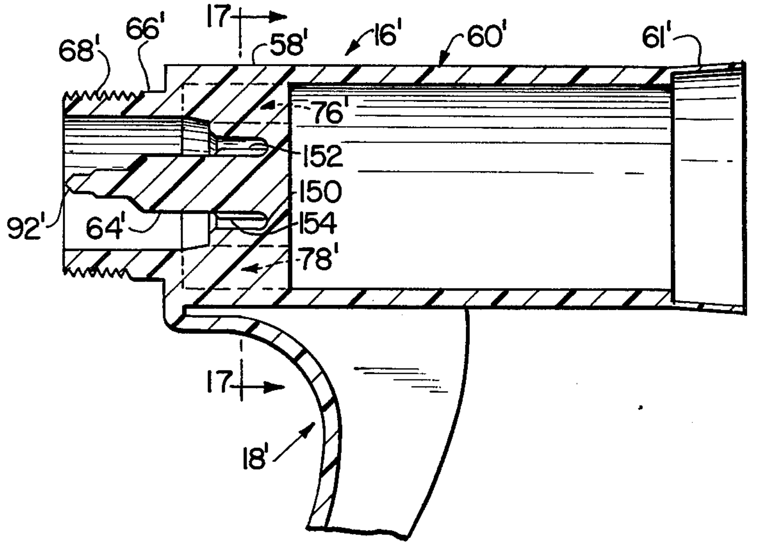
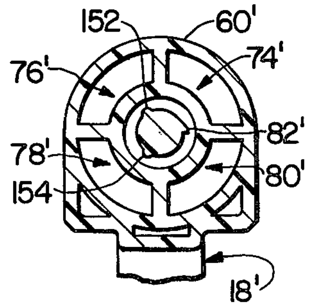
FIG. 17

PUMP DISPENSER WITH ADJUSTABLE NOZZLE

FIELD OF THE INVENTION

The invention relates to a manually-operated pump dispenser for dispensing liquids from a container. The dispenser includes a housing coupled to the container, a dip tube extending from the housing into the container, a pump member which is slidably supported on the housing and which has a trigger extending therefrom and a nozzle member at the end, a pair of one-way valves including an inboard and an outboard valve, a one-piece plastic tubular member which engages the pump member and the housing and forms a part of at least one of the valves in the dispenser, and a spring engaging a portion of the pump member and the tubular member for biasing the pump member away from the housing. Alternatively, the inboard valve is formed by the housing and the pump member, the outboard valve is formed by the pump member and the nozzle member, and the tubular member is eliminated.

BACKGROUND OF THE INVENTION

Manually-operated pump dispensers for dispensing liquids from a container have long been known. They are typically in two forms, one being commonly referred to as a trigger sprayer and the other being referred to as a finger pump. In the trigger sprayer, the operator's hand grasps a housing and the operator's index and middle fingers engage a trigger which is pivotable or longitudinally movable towards the housing to dispense liquid from a container coupled to the housing. In the finger pump type of dispenser the operator's hand once again grasps a housing and usually only the operator's index finger engages a vertically slidable pump member that reciprocates in the housing. These dispensers, in either form, thus typically comprise a housing and a movable pumping member with some sort of nozzle at the end of the movable member to dispense the liquid in a spray or stream. To provide the required pumping action, these devices require two one-way, or check, valves along the flow of the liquid and a biasing member to move the pump member away from the housing after it has been moved towards the housing.

While these devices are well known, there is a continued need for improvement in their construction and operation. Thus, many of the prior art devices have numerous parts, are complicated to manufacture, are not reliable since they tend to leak, and are not easily produced by an efficient injection molding process.

Examples of these prior art devices are disclosed in the following U.S. Pat. Nos. 2,753,578 to Lebet; 3,044,413 to Corsette; 3,102,489 to Corsette et al; 3,282,472 to Roder; 3,527,551 to Kutik et al; 3,877,616 to Stevens; 4,072,252 to Steyns et al; 4,159,067 to Akers; 4,249,681 to French and 4,273,268 to Wickenberg.

SUMMARY OF THE INVENTION

Accordingly, a primary object of the invention is to provide a pump dispenser that has a limited number of parts, is simple to construct and operate, resists leakage and is easily produced by injection molding of its parts.

Another object of the invention is to provide a pump dispenser with a one-piece plastic tubular member forming a part of the inboard valve and a nozzle member forming a part of the outboard valve to reduce the costs of manufacture of the dispenser.

Another object of the invention is to provide such a pump dispenser in which the one-piece plastic tubular member forms a part of both of the one-way valves in the dispenser for ease of manufacture and to reduce the costs of manufacture.

Another object of the invention is to provide such a pump dispenser in which the outboard valve is formed by the nozzle and pump members, the inboard valve is formed by the pump member and the housing and the separate tubular member is eliminated.

The foregoing objects are basically attained by providing in a manually-operated pump dispenser including a housing adapted to be coupled to a liquid-containing bottle and having a fluid passageway, a dip tube extending from the passageway into the bottle and a vent for venting the bottle to the atmosphere; a pump member having a fluid passageway with an exit orifice, and a finger engaging element, the pump member being slidably engaged with the housing; and a pair of one-way valves located along the pump member and the housing fluid passageways, the improvement comprising a one-piece, plastic, tubular member engaging the housing and slidably engaging the pump member, this tubular member forming a part of at least one of the pair of one-way valves and defining a fluid passageway adapted to communicate with the fluid passageways in the pump member and housing upon opening of the valves; and a spring engaging a portion of the pump member and said tubular member for biasing the pump member away from the housing.

In a first embodiment shown in FIGS. 1–9, the plastic tubular member forms a part of both of the one-way valves.

In a second embodiment shown in FIGS. 10–17, the tubular member forms a part of the inboard one-way valve, the outboard valve being formed by a plastic nozzle member supporting the valve member and the plastic pump member supporting the valve seat.

In a third embodiment shown in FIG. 18, the nozzle member supports the valve seat and the pump member supports the valve member on the outboard valve.

In a fourth embodiment shown in FIG. 19, the inboard valve is formed by the housing and the pump member, the outboard valve is formed by the pump and nozzle members, and the tubular member is eliminated.

Other objects, advantages and salient features of the invention will become apparent from the following detailed description, which, taken in conjunction with the annexed drawings, discloses preferred embodiments of the invention.

DRAWINGS

Referring now to the drawings which form a part of this original disclosure:

FIG. 1 is an elevational view in longitudinal section of the first embodiment of the invention shown in its assembled, relaxed condition;

FIG. 2 is an enlarged elevational view in longitudinal section of the one-piece plastic tubular member forming a part of the outboard and inboard valves as shown in FIG. 1;

FIG. 3 is an enlarged, fragmentary elevational view in longitudinal section of the nozzle member coupled to the end of the pump member;

FIG. 4 is an enlarged left side elevational view in section taken along line 4—4 in FIG. 3 showing the child-proof locking splines located on the pump member and the nozzle member;

FIG. 10 is an elevational view in longitudinal section of a second embodiment of the invention where the plastic tubular member forms a part of the inboard valve and the outboard valve is formed by the nozzle member and the pump member;

FIG. 11 is an enlarged elevational view in longitudinal section of the plastic tubular member shown in FIG. 10;

FIG. 12 is an enlarged, fragmentary elevational view in longitudinal section of the outboard valve formed by the pump member and nozzle member;

FIG. 13 is an enlarged side elevational view in transverse section taken along line 13—13 in FIG. 12 showing the child-proof locking splines on the pump and nozzle members;

FIG. 14 is an elevational view in longitudinal section of the dispenser shown in FIG. 10 except that the pump member is moving towards the housing, thereby compressing the spring and the outboard valve is open to allow fluid to be expelled from the dispenser;

FIG. 15 is an elevational view similar to that shown in FIG. 14 except that the pump member is moving away from the housing under the influence of the spring and the inboard valve is open to allow liquid to pass therethrough from the container;

FIG. 16 is an elevational view in longitudinal section of the pump member shown in FIG. 10 by itself;

FIG. 17 is a side elevational view in transverse section taken along line 17—17 in FIG. 16 showing a locking spline as well as two valve limiting splines located on the pump member;

Figure 18:
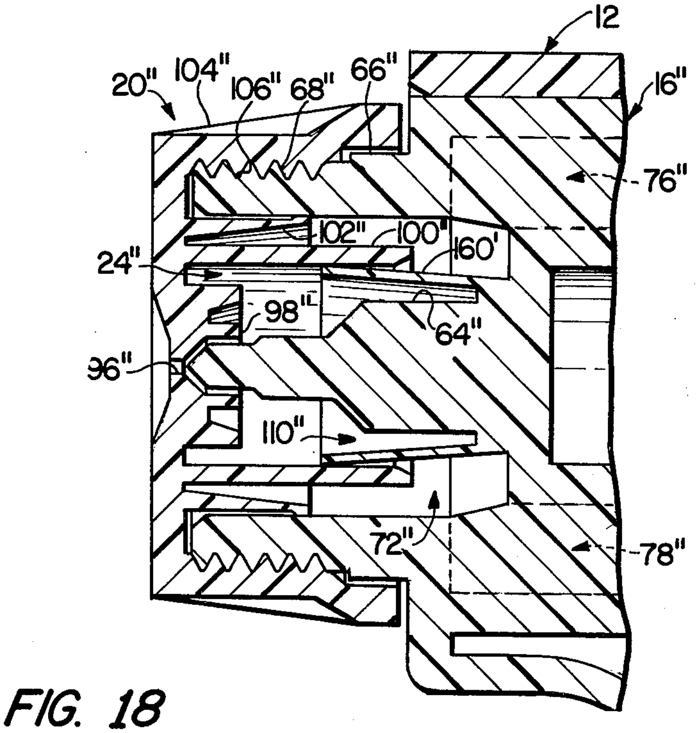
Figure 19:
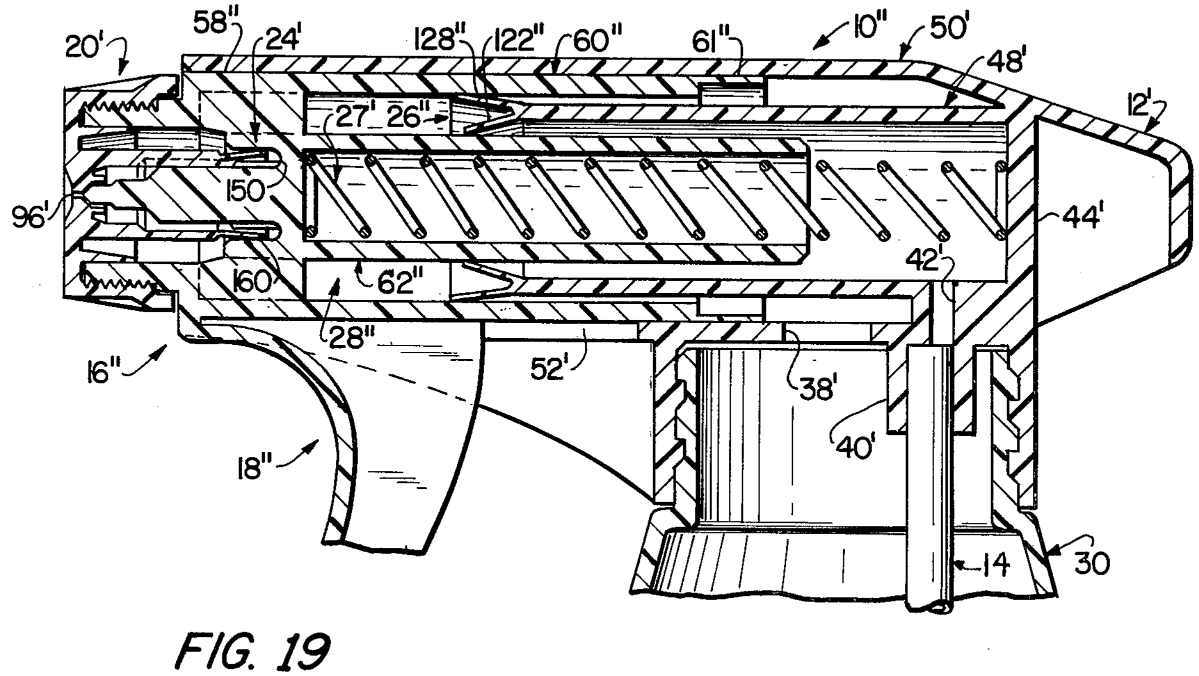

FIG. 18 is an enlarged, fragmentary elevational view of a third embodiment of the invention in longitudinal section of the outboard valve formed by the pump member and nozzle member; and FIG. 19 is an elevational view in longitudinal section of a fourth embodiment of the invention wherein the outboard valve is formed by the nozzle and pump members and the inboard valve is formed by the housing and the pump member.

DETAILED DESCRIPTION OF FIGS. 1–9

Figure 5:
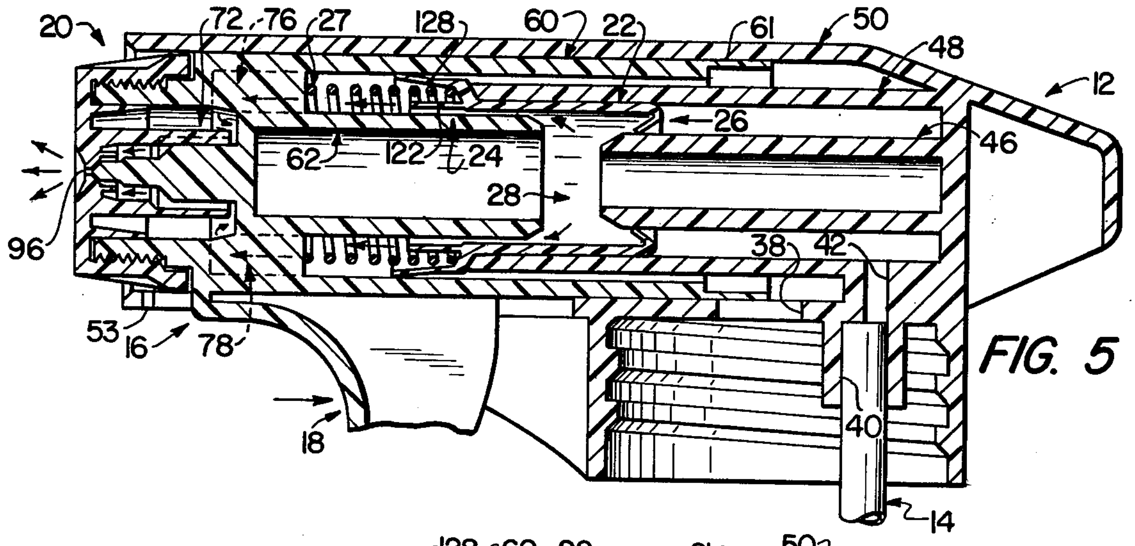
FIG. 5 is a fragmentary elevational view in longitudinal section similar to that shown in FIG. 1 except that the pump member is moving longitudinally towards the housing, thereby longitudinally compressing the spring, and the outboard valve is open to allow fluid to exit from the dispenser.

As seen in FIG. 1, the pump dispenser 10 in accordance with the invention is in its relaxed condition and comprises a housing 12, a dip tube 14 extending from the housing, a pump member 16 slidably engaged with the housing and having a trigger 18 extending therefrom and a nozzle member 20 at the end, a tubular member 22 located inside the pump member and the housing, an outboard valve 24, an inboard valve 26, a restoring spring 27, and a product chamber 28 defined inside the dispenser. The housing 12 is coupled to the container or bottle 30 and the dip tube extends from the housing into the container. This container has a liquid therein which is dispensed in a stream or spray by means of longitudinal reciprocation of the pump member 16 relative to the housing 12. This reciprocation is accomplished by the operator gripping the housing and manually engaging the trigger with the index and middle fingers and pumping the pump member relative to the housing. This pumping alternately opens and closes the outboard and inboard valves, resulting in the desired dispensing of the liquid from the container. The restoring force provided to the pump member to move it away from the housing is generated by the potential energy created in the coiled restoring spring 27 as it is longitudinally compressed as the pump member is moved towards the housing as seen in FIG. 5. The tubular member 22 forms a part of both of the valves 24 and 26, and is formed of plastic by injection molding, as are the pump member, housing and nozzle member.

Figure 6:
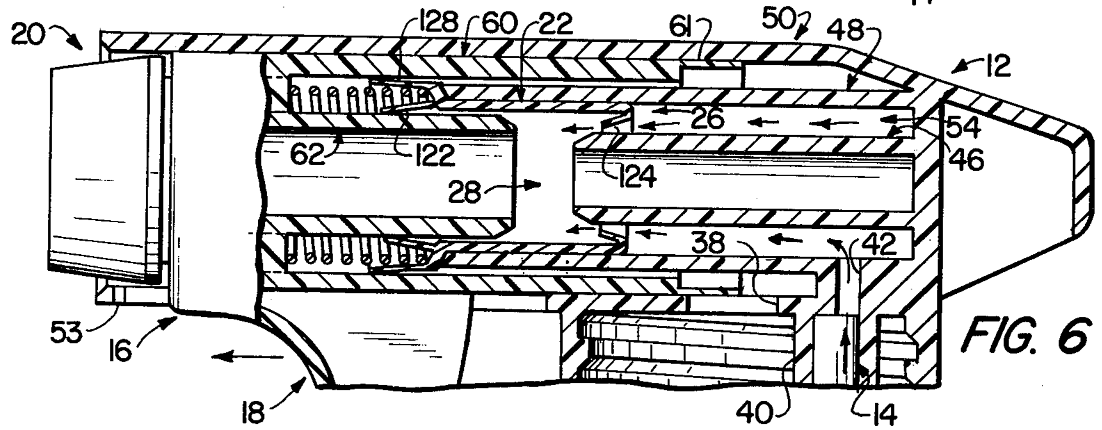
FIG. 6 is a fragmentary, elevational view in longitudinal section similar to that shown in FIG. 5 except that the pump member is moving away from the housing under the influence of the restoring force generated by the compressed spring and the inboard valve is open to allow liquid from the container to move past this valve.
Figure 9:
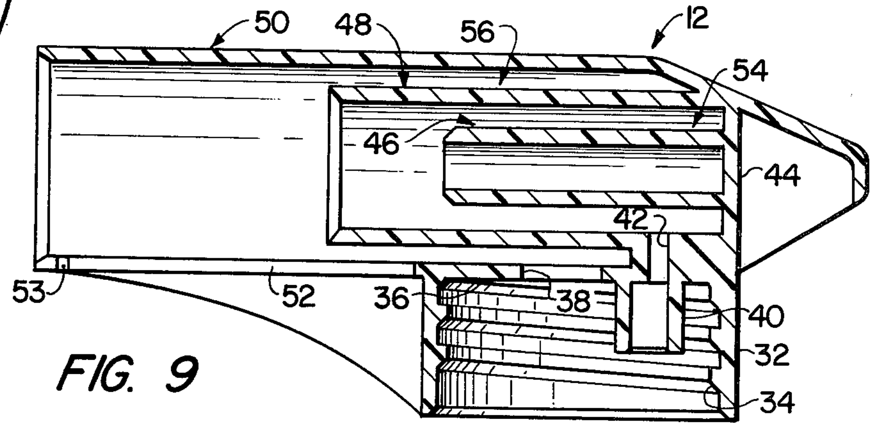
FIG. 9 is an elevational view in longitudinal section of the housing by itself.

Referring now to FIG. 9, the housing 12 is preferably formed of a rigid plastic, such as polyethylene or polypropylene, as a one-piece member by injection molding. The housing has a vertically oriented cylindrical base 32 with threads 34 formed on the inside thereof and a horizontally oriented, disc-shaped wall 36 above the base 32 with a vertically oriented vent 38 formed centrally thereof. Extending downwardly from horizontal wall 36 is a vertically oriented cylindrical tube 40 for the reception of the dip tube 14, as seen in FIGS. 1, 5 and 6, this cylindrical tube 40 having a fluid passageway 42 of smaller diameter communicating therewith and formed in the wall 36. Extending upwardly from the rear of horizontal wall 36 is a vertical, curved rear wall 44 that has three horizontally oriented cylindrical and concentric tubes extending therefrom including an inner tube 46, a central tube 48 and an outer tube 50, which forms the outer surface of the housing and which has a longitudinal slot 52 at the bottom thereof in front of the cylindrical base 32. This slot receives the trigger 18 on the pump member. At the end of this slot are two opposed, inwardly facing locking lugs 53 which engage the trigger once the pump member is slid onto the housing to prevent disassembly of and provide an outward stop for the pump member. When the pump member is slid onto the housing, these lugs spread apart to allow the trigger past. The inner tube 46 is shorter than the central tube 48 which in turn is shorter than the outer tube 50. The inner tube 46 forms a valve seat and the cylindrical recess 54 between inner and central tubes 46 and 48 forms a fluid passageway communicating with fluid passageway 42 in the housing. Another cylindrical recess 56 is formed between the central and outer cylindrical tubes 48 and 50 for the slidable reception of the pump member 16 as seen in FIGS. 1, 5 and 6.

Figure 7:
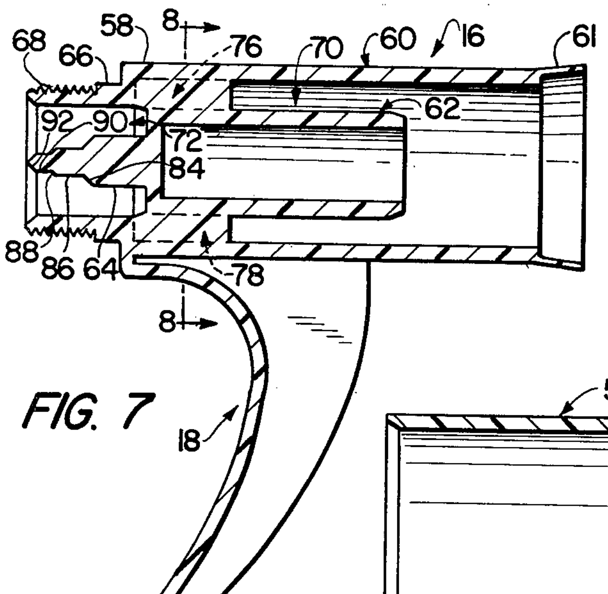
FIG. 7 is an elevational view in longitudinal section of the pump member by itself.
Figure 8:
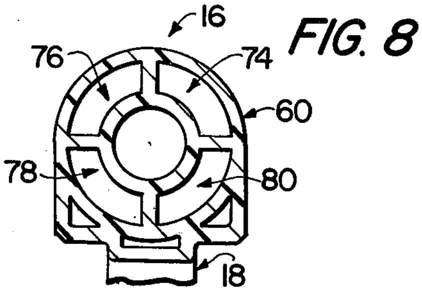
FIG. 8 is a side elevational view of the pump member in section taken along line 8—8 in FIG. 7.

Referring now to FIG. 7, the pump member 16 is shown by itself as being formed by injection molding as a one-piece, rigid plastic member, such as polyethylene or polypropylene. The pump member comprises an annular body member 58, an outer cylindrical tube 60 extending rearwardly from the body member with a thin outwardly diverging frustoconical lip 61 at the rear end, an inner cylindrical tube 62 extending rearwardly from the body member and inside and concentric to the outer tube 60, a cylindrical stem 64 extending forwardly from the body member and a cylindrical tube 66 extending forwardly from the body member concentric to the cylindrical stem 64 and having threads 68 on the exterior thereof. As seen in FIG. 7, the trigger 18 is integrally formed with the remaining parts of the pump member and extends downwardly from the outer cylindrical tube 60. The inner cylindrical tube 62 forms a valve seat for the outboard valve 24 and a cylindrical recess 70 defined between cylindrical tubes 60 and 62 forms a fluid passageway in the pump member. Similarly, the annular recess 72 defined between the stem 64 and cylindrical tube 66 forms a fluid passageway in the pump member. These recesses 70 and 72 are connected, as seen in FIG. 8, by four fluid passageways 74, 76, 78 and 80 formed through the body member 58. As seen in FIG. 4, the cylindrical stem 64 has a longitudinally extending locking spline 82 extending outwardly therefrom to prevent removal of the nozzle member 20 from the pump member as will be described in more detail hereinafter. The prevention of removal of the nozzle member is intended as a child-proof feature.

As seen in FIG. 7, the cylindrical stem 64 extends from the center of the body member 58 and has at its end a frustoconical surface 84 which extends into a reduced diameter cylindrical rod 86 which extends into a frustoconical surface 88, which in turn extends into a further reduced diameter cylindrical rod 90 having a frustoconical tip 92 at the end.

Referring now to FIG. 3, the nozzle member 20 is preferably injection molded and formed of plastic, such as polypropylene or polyethylene which is more resilient than the material forming the housing and pump member. The nozzle member comprises a disc-shaped body member 94 having a central exit orifice 96 therein with a rearwardly facing frustoconical counterbore 97. This orifice in conjunction with tip 92 and swirl member 98 provide a stream or spray of fluid as desired, this orifice forming a fluid passageway for the fluid in the dispenser. Extending from the rear of the body member 94 is the conventional two-part, swirl member 98, a longer outer cylindrical tube 100 concentric with member 98, a frustoconical sealing member 102 concentric to but on the outside of outer cylindrical tube 100, and a rim 104 having internal threads 106 for engaging threads 68 on the pump member 16.

As seen in FIG. 3, when these threads are engaged, the frustoconical sealing member 102 is biased into a sealing engagement with the inner cylindrical surface of cylindrical tube 66 on the pump member, member 98 surrounds cylindrical rod 90 on the end of the stem 64 and the outer cylindrical tube 100 surrounds stem 64. As seen in FIG. 4, a locking spline 108 extends radially inwardly of the outer cylindrical tube 100 into engagement with the outer surface of cylindrical stem 64. The two locking splines 82 and 108 will allow tube 100 to rotate clockwise relative to stem 64 as the nozzle member 20, with right-handed threads, is rotated onto the pump member 16. This is accomplished by a slight outward expansion of the cylindrical tube 100 as the locking splines slide past one another in the clockwise direction. However, each of these locking splines has a radially directed stop shoulder so that counterclockwise rotation through 360° of these two members would be prevented by an engagement of these shoulders. In all events, this feature is intended to prevent a child from inadvertently removing the nozzle member from the pump member.

As best seen in FIG. 3, fluid, i.e., air or liquid, can pass from the fluid passageways 74, 76, 78 and 80 in the pump member 16 to the orifice 96 by following a path from these fluid passageways through the cylindrical recess 72 between cylindrical tube 100 on the nozzle member and cylindrical tube 66 on the pump member, then between cylindrical tube 100 and stem 64 in a passageway 110 therebetween and then out the orifice 96, the frustoconical tip 92 being spaced from orifice 96 and bore 97 as illustrated in FIG. 3. This space is provided by rotating the nozzle member counter-clockwise relative to the pump member.

Referring now to FIG. 2, the tubular member 22 is shown by itself as consisting of a flexible, resilient one-piece member formed of plastic, such as polypropylene or polyethylene. The tubular member comprises a main cylindrical portion 120 having a frustoconical inwardly tapering lip 122 at the forward end and a frustoconical inwardly tapering lip 124 at the rear end, a frustoconical portion 126 extending radially outwardly from the cylindrical portion adjacent the forward lip 122, and an outer frustoconical seal 128 extending from the frustoconical portion 126. A recess 130 is formed by lip 122, portion 126 and seal 128 to receive the spring 27.

As seen in FIG. 1, the forward lip 122 of the tubular member 22 engages the outer surface of cylindrical tube 62 in the pump member and the rear lip 124 in the tubular member engages the outer surface of cylindrical tube 46 in the housing. Thus, lips 122 and 124 form valve members while cylindrical tubes 46 and 62 form valve seats. The frustoconical portion 126 as seen in FIG. 2 between cylindrical portion 120 and seal 128 on the tubular member engages central cylindrical tube 48 in the housing so that the end of central tube 48 prevents rearward movement of the tubular member relative to the housing. The hollow interior of the tubular member 22 defines a fluid passageway adapted to communicate with the fluid passageways in the pump member and housing upon opening of the inboard and outboard valves.

As seen in FIGS. 1, 5 and 6, the seal 128 on the tubular member 22 is in a slidable, sealing engagement with the inner cylindrical surface of the outer cylindrical tube 60 in the pump member and the thin frustoconical lip 61 on the end of the pump member is in slidable sealing engagement with the inner cylindrical surface of outer cylindrical tube 50 in the housing. As seen in FIG. 1, this second sealing engagement by lip 61 closes the vent 38 in the housing from communication with the atmosphere. However, as seen in FIGS. 5 and 6, when the pump member is moved towards the housing it moves the lip 61 past an edge of the vent 38 allowing the vent to communicate with the atmosphere along the annular space between the outer surface of the pump member and the inner surface of outer cylindrical tube 50 of the housing, this space being formed by the necessary tolerance to allow sliding movement of the pump member relative to the housing. Thus, the lip 61 is a vent regulating member for opening and closing the vent to the atmosphere.

As is evident from FIGS. 1 and 2, the forward lip 122 forms a resilient valve member in the outboard valve 24 and the rear lip 124 forms a resilient valve member in the inboard valve 26.

As seen in FIG. 1, the container 30 has external threads 138 thereon for engaging with internal threads 34 in the housing to secure the container to the housing. Any other suitable connection can be used to connect these members, advantageously this connection including a gasket or some similar device, not shown, to make this connection substantially air-tight and leak-proof.

As seen in FIG. 1, a product chamber 28 is formed by the pump member, the tubular member and the housing, the size of this product chamber being variable depending upon the volume of the bores in cylindrical tubes 46 and 62 in the housing and the pump member.

Operation

As seen in FIG. 1, the pump dispenser 10 in accordance with the invention is in its rest, relaxed position with both one-way valves 24 and 26 being closed.

With liquid in the container 30 and the nozzle member open, the trigger 18 is engaged by the operator to pull the pump member 16 towards the housing in a longitudinally sliding movement as seen in FIG. 5. This movement causes the spring 27, which engages a portion of the pump member and the tubular member, to compress longitudinally as seen in FIG. 5 and also causes the expelling of air from the product chamber 28 past outboard valve 24 and out the orifice 96 in the nozzle member. The outboard valve 24 opens under the air pressure created by this movement as the forward thin, resilient lip 122 is biased radially outwardly away from engagement with cylindrical tube 62. The air then moves through the recess 70 between tubes 60 and 62 in the pump member, through fluid passageways 74, 76, 78 and 80 in the pump member, between the nozzle member cylindrical tube 100 and pump member stem 64 through recess 110, as seen in FIG. 3, and then out the orifice 96 as indicated in FIG. 5.

The operator's pressure on the trigger 18 is then released and the stored potential energy in the spring 27 drives the pump member away from the housing as indicated in FIG. 6.

A partial vacuum is formed in product chamber 28 as the pump member moves away from the housing, and thus liquid from the container moves into the product chamber past the inboard valve 26 as seen in FIG. 6. This valve opens since the thin, resilient lip 124 is driven away from cylindrical tube 46 by the movement of the liquid into the product chamber. The liquid moves from the container 30 up the dip tube 4, through fluid passageway 42 in the housing, along the cylindrical recess 54 between tubes 46 and 48 in the housing and then through the gap between lip 124 and tube 46.

When forward movement of the pump member is completed, the next movement of the pump member towards the housing will expel the liquid in the product chamber 28 out of the nozzle member 20 as seen in FIG. 5 as outboard valve 24 opens under the influence of the liquid moving past it.

EMBODIMENT OF FIGURES 10–17

In the embodiment of FIGS. 10–17, the construction of the pump dispenser 10′ is similar to that shown in FIGS. 1–9 and explained above regarding pump dispenser 10 except that the plastic tubular member forms only a part of the inboard valve and the outboard valve is formed by the nozzle member and the pump member.

The housing 12 is the same in both embodiments as are the dip tube and container. Thus, the same reference numerals are used in the embodiment of FIGS. 10–17.

The pump member in this second embodiment is the same as pump member 16 in the first embodiment with the addition of a cylindrical recess 150 seen in FIGS. 10, 12 and 14–16 and a pair of limiting splines 152 and 154 seen best in FIGS. 16 and 17. Because the remaining parts of the pump member 16′ are the same as those discussed above their reference numerals will be used again in this section regarding the second embodiment but with a prime. In addition, as seen by comparing FIGS. 7 and 16, the inner cylindrical tube 62 in FIG. 7 is eliminated and the body member 58′ is without a central bore.

As seen best in FIG. 12, the forwardly opening cylindrical recess 150 formed in pump member 16′ has a radially inwardly facing cylindrical surface 156 and a radially outwardly facing cylindrical surface 158. The limiting splines 152 and 154 extend from surface 158, with surface 156 acting as a valve seat as will be described in more detail hereinafter.

The nozzle member 20′ is the same as that shown and described above regarding the first embodiment except that is has at the end of cylindrical tube 100′ an integrally formed thin, outwardly diverging frustoconical member 160 as best seen in FIG. 12. This member is in engagement with cylindrical recess 156 and forms a valve member for the outboard valve 24′. The remaining parts of the nozzle member are the same as those discussed above regarding FIGS. 1–9 and are thus given the same reference numerals but with a prime.

As seen in FIGS. 12 and 14, valve 24′ will open when frustoconical member 160 is biased radially inwardly away from cylindrical surface 156. To prevent frustoconical member 160 from completely engaging cylindrical surface 158 and thereby closing off a fluid passageway, the limiting splines 152 and 154 are used to keep member 160 from completely engaging surface 158.

As seen in FIG. 11, the tubular member 22′ is the same as that described above regarding the first embodiment except that the forward lip 122 is removed. The remaining parts are the same as those discussed above regarding FIGS. 1–9 and are thus given the same reference numerals but with a prime.

Operation

The second embodiment shown in FIGS. 10–17 operates generally like the first embodiment, with the inboard valve 26′ operating exactly the same way.

The outboard valve 24′ operates differently since the pump member and nozzle member form this valve. Thus, as seen in FIG. 14, when the trigger 18′ is engaged and the pump member 16′ moves towards the housing 12, air or liquid will move over the resilient frustoconical member 160 driving it radially inwardly into engagement with limiting splines 152 and 154 as seen specifically in FIG. 14. Then, the fluid moves towards and through the orifice 96′ between stem 64′ and the remaining structure of the nozzle member 20′ as discussed above regarding the first embodiment.

EMBODIMENT OF FIG. 18

FIG. 18 shows an outboard valve 24″ similar to that shown in FIGS. 10, 12, 14 and 15 except that the thin, resilient frustoconical valve member 160′ is integrally formed with the pump member 16″ and the cylindrical valve seat 100″ is integrally formed with the nozzle member 20″. In addition, the two locking splines and the two limiting splines on the nozzle and pump members are eliminated. The remaining parts are the same as shown in FIGS. 10, 12, 14 and 15 and are given the same reference numerals plus a prime.

The operation of the outboard valve 24" is basically the same as described above regarding outboard valve 24' with fluid opening the valve 24" by moving the frustoconical valve member 160' radially inwardly away from contact with the inner cylindrical surface on the cylindrical valve member 100". In this embodiment, the valve member 100" defines a cylindrical recess 110" through which the fluid passes towards orifice 96".

EMBODIMENT OF FIG. 19

FIG. 19 shows an alternate embodiment of the overall pump dispenser 10" wherein the outboard valve 24' is the same as shown in FIGS. 10, 12, 14, and 15 but the inboard valve 26" is different. This is a result of modification of the pump member and the housing—in particular, formation of the inboard valve member integrally with the housing, formation of the inboard valve seat integrally with the pump member and elimination of the separate tubular member used in the first and second embodiments.

Thus, the nozzle member 20' is the same as that described above and shown in FIGS. 10, 12, 14 and 15.

The pump member 16" is the same as that described above and shown in FIGS. 10, 12, and 14–17 except that an inner cylindrical tube 62" is integrally formed with the body member 58" and extends rearwardly therefrom inside and concentric to outer cylindrical tube 60". This inner cylindrical tube 62" forms a valve seat for the inboard valve 26". The restoring coiled spring 27' is received in tube 62", engages the body member 58" at one end and engages wall 44' of the modified housing 12' at the outer end.

The housing 12' is the same as that described above and shown in FIG. 9 except that the inner tube 46 is eliminated; a thin, outwardly diverging frustoconical sealing member 128" extends integrally from tube 48' in the housing into a slidable sealing engagement with the inner cylindrical surface of tube 60" in the pump member; and a thin, inwardly converging frustoconical lip 122" extends integrally from tube 48' into a slidable engagement with the outer cylindrical surface of tube 62" in the pump member. Both of the lips are resilient.

Thus, the separate tubular members 22 and 22' discussed above are eliminated completely and the inboard valve 26" is formed by lip 122" on the housing 12' as a valve member and tube 62" on the pump member 16" as a valve seat. In this embodiment, the product chamber 28" is formed between the tubes 60" and 62" in the pump member.

While various embodiments have been chosen to illustrate the invention, it will be understood by those skilled in the art that various changes and modifications can be made therein without departing from the scope of the invention as defined in the appended claims.

What is claimed is:

1. In a manually-operated pump dispenser including a housing adapted to be coupled to a liquid-containing bottle and having a fluid passageway, a dip tube extending from the passageway into the bottle and a vent for venting the bottle to the atmosphere; a pump member having a fluid passageway communicating with the fluid passageway in the housing, and a finger engaging element, the pump member being slidably engaged with the housing; means for biasing the pump member away from the housing; and a pair of one-way valves located along the pump member and the housing fluid passageways, the improvement comprising:

a nozzle member having a fluid passageway with an exit orifice;

means for adjustably coupling the nozzle member to the pump member so that the fluid passageways in each communicate;

a recess having an annular surface formed by one of the pump and nozzle members as a valve seat along the fluid passageway therein; and an annular, resilient valve member integrally formed with the other of the pump and nozzle members and engaging said annular surface in said recess, thereby forming one of the one-way valves, said means for coupling including means for preventing relative longitudinal movement of said nozzle member and said pump member during opening and closing of the one-way valve formed thereby, said nozzle member and said pump member having cooperating means for varying the flow of fluid to be exhausted via said exit orifice upon adjusting the coupling of said nozzle and pump members.

2. A pump dispenser according to claim 1, wherein said valve member is integrally formed with said nozzle member, and said valve seat is formed by said pump member.

3. A pump dispenser according to claim 1, wherein said valve member is formed of plastic.

4. A pump dispenser according to claim 1, wherein said valve member is frustoconical.

5. A pump dispenser according to claim 1, wherein said valve member is integrally formed with said pump member, and 'said valve seat is formed by said nozzle member.

6. A pump dispenser according to claim 1, wherein said valve seat is generally radially inwardly facing, and said valve member is generally radially outwardly facing.

7. A pump dispenser according to claim 1, wherein said cooperating means includes means for varying the pattern of the fluid exhausted via said exit orifice.

8. A pump dispenser according to claim 1, wherein said cooperating means includes means for selectively opening and closing the fluid passageway in said nozzle member.

9. A pump dispenser according to claim 1, wherein said cooperating means includes means for selectively varying the pattern of the fluid exhausted via said exit orifice and opening and closing the fluid passageway in said nozzle member.

10. A pump dispenser according to claim 1, wherein the housing includes a cylindrical portion containing the vent therein, and the pump member includes a vent regulating portion in slidable engagement with the housing cylindrical portion for movement with the pump member from a first position sealing the vent from the atmosphere to a second position opening the vent to the atmosphere.

11. In a pump dispenser having first means defining a fluid passageway, a dip tube extending from the fluid passageway into a container, second means for coupling the container to the first means, a vent formed in the first means and communicating with the interior of the container, an outboard one-way valve and an inboard one-way valve located along the fluid passageway and defining a product chamber therebetween, a finger engaging element coupled to the first means for movement from a first position to a second position to vary the volume of the product chamber, third means for biasing the finger engaging element from the second position to the first position, a nozzle member, and fourth means for coupling the nozzle member to the first means at the end of the fluid passageway, the improvement comprising:

said outboard one-way valve being formed by an annular valve seat coupled to one of said nozzle member and said first means, and an annular, resilient valve member formed integrally with the other of said nozzle member and said first means and engaging said valve seat, said fourth means for coupling including means for preventing relative longitudinal movement of said nozzle member and said first means during opening and closing of the outboard one-way valve formed thereby, said fourth means for coupling including means for adjustably coupling said nozzle member and said first means, said nozzle member and said first means having cooperating means for varying the flow of fluid to be exhausted via said nozzle member upon adjusting the coupling of said nozzle member and said first means.

12. In a manually-operated pump dispenser including a housing adapted to be coupled to a liquid-containing bottle and having a fluid passageway, a dip tube extending from the passageway into the bottle and a vent for venting the bottle to the atmosphere; a pump member having a fluid passageway communicating with the fluid passageway in the housing, and a finger engaging element, the pump member being slidably engaged with the housing; means for biasing the pump member away from the housing; and a pair of one-way valves located along the pump member and the housing fluid passageways, the improvement comprising:

a nozzle member having a fluid passageway with an exit orifice;

means for coupling the nozzle member to the pump member so that the fluid passageways in each communicate, said means for coupling including means for rotatably coupling said nozzle member to said pump member;

a recess having an annular surface formed by one of the pump and nozzle members as a valve seat along the fluid passageway therein; and an annular, resilient valve member integrally formed with the other of the pump and nozzle members and engaging said annular surface in said recess, thereby forming one of the one-way valves, said nozzle member and said pump member having cooperating means for varying the pattern of the fluid exhausted via said exit orifice upon relative rotation of said nozzle member and said pump member.

13. In a manually-operated pump dispenser including a housing adapted to be coupled to a liquid-containing bottle and having a fluid passageway, a dip tube extending from the passageway into the bottle and a vent for venting the bottle to the atmosphere; a pump member having a fluid passageway communicating with the fluid passageway in the housing, and a finger engaging element, the pump member being slidably engaged with the housing; means for biasing the pump member away from the housing; and a pair of one-way valves located along the pump member and the housing fluid passageways, the improvement comprising:

a nozzle member having a fluid passageway with an exit orifice;

means for coupling the nozzle member to the pump member so that the fluid passageways in each communicate, said means for coupling including means for providing relative longitudinal movement between said nozzle member and said pump member;

a recess having an annular surface formed by one of the pump and nozzle members as a valve seat along the fluid passageway therein; and an annular, resilient valve member integrally formed with the other of the pump and nozzle members and engaging said annular surface in said recess, thereby forming one of the one-way valves, said nozzle member and said pump member having cooperating means for varying the pattern of the fluid exhausted via said exit orifice upon relative longitudinal movement of said nozzle member and said pump member.

14. In a manually-operated pump dispenser including a housing adapted to be coupled to a liquid-containing bottle and having a fluid passageway, a dip tube extending from the passageway into the bottle and a vent for venting the bottle to the atmosphere; a pump member having a fluid passageway communicating with the fluid passageway in the housing, and a finger engaging element, the pump member being slidably engaged with the housing; means for biasing the pump member away from the housing; and a pair of one-way valves located along the pump member and the housing fluid passageways, the improvement comprising:

a nozzle member having a fluid passageway with an exit orifice;

means for coupling the nozzle member to the pump member so that the fluid passageways in each communicate;

a recess having an annular surface formed by one of the pump and nozzle members as a valve seat along the fluid passageway therein; and an annular, resilient valve member integrally formed with the other of the pump and nozzle members and engaging said annular surface in said recess, thereby forming one of the one-way valves, said means for coupling comprising a helically threaded portion on said nozzle member threadedly engaging a helically threaded portion on said pump member.

15. In a pump dispenser having first means defining a fluid passageway, a dip tube extending from the fluid passageway into a container, second means for coupling the container to the first means, a vent formed in the first means and communicating with the interior of the container, an outboard one-way valve and an inboard one-way valve located along the fluid passageway and defining a product chamber therebetween, a finger engaging element coupled to the first means for movement from a first position to a second position to vary the volume of the product chamber, third means for biasing the finger engaging element from the second position to the first position, a nozzle member having an exit orifice, and fourth means for coupling the nozzle member to the first means at the end of the fluid passageway, the improvement comprising:

said outboard one-way valve being formed by an annular valve seat coupled to one of said nozzle member and said first means, and an annular, resilient valve member formed integrally with the other of said nozzle member and said first means and engaging said valve seat, said fourth means for coupling including means for rotatably coupling said nozzle member to said first means, said nozzle member and said first means having cooperating means for varying the pattern of the fluid exhausted via said exit orifice upon relative rotation of said nozzle member and said first means.

16. In a pump dispenser having first means defining a fluid passageway, a dip tube extending from the fluid passageway into a container, second means for coupling the container to the first means, a vent formed in the first means and communicating with the interior of the container, an outboard one-way valve and an inboard one-way valve located along the fluid passageway and defining a product chamber therebetween, a finger engaging element coupled to the first means for movement from a first position to a second position to vary the volume of the product chamber, third means for biasing the finger engaging element from the second position to the first position, a nozzle member having an exit orifice, and fourth means for coupling the nozzle member to the first means at the end of the fluid passageway, the improvement comprising:

said outboard one-way valve being formed by an annular valve seat coupled to one of said nozzle member and said first means, and an annular, resilient valve member formed integrally with the other of said nozzle member and said first means and engaging said valve seat, said fourth means for coupling including means for providing relative longitudinal movement between said nozzle member and said first means, said nozzle member and said first means having cooperating means for varying the pattern of the fluid exhausted via said exit orifice upon relative longitudinal movement of said nozzle member and said first means.

17. In a pump dispenser having first means defining a fluid passageway, a dip tube extending from the fluid passageway into a container, second means for coupling the container to the first means, a vent formed in the first means and communicating with the interior of the container, an outboard one-way valve and an inboard one-way valve located along the fluid passageway and defining a product chamber therebetween, a finger engaging element coupled to the first means for movement from a first position to a second position to vary the volume of the product chamber, third means for biasing the finger engaging element from the second position to the first position, a nozzle member, and fourth means for coupling the nozzle member to the first means at the end of the fluid passageway, the improvement comprising:

said outboard one-way valve being formed by an annular valve seat coupled to one of said nozzle member and said first means, and an annular, resilient valve member formed integrally with the other of said nozzle member and said first means and engaging said valve seat, said fourth means for coupling comprising a helically threaded portion on said nozzle member threadedly engaging a helically threaded portion on said first means.

* * * * *